United States Patent
Bitner

[11] Patent Number: 5,988,520
[45] Date of Patent: Nov. 23, 1999

[54] DEODORANT AND PESTICIDE RELEASING TRASH CAN DEVICE

[76] Inventor: Anna Bitner, 830 S. Hilda St., Anaheim, Calif. 92806

[21] Appl. No.: 09/137,268

[22] Filed: Aug. 20, 1998

[51] Int. Cl.[6] .............................. B65D 25/34; A61L 9/04
[52] U.S. Cl. ......................... 239/6; 220/87.1; 220/300; 239/59; 239/60
[58] Field of Search .................... 239/6, 59, 60; 220/87.1, 300, 522, 908

[56] References Cited

U.S. PATENT DOCUMENTS

| | | | |
|---|---|---|---|
| 1,719,185 | 7/1929 | Lowy | 220/87.1 |
| 2,573,548 | 10/1951 | Cunningham | 220/87.1 |
| 2,642,310 | 6/1953 | Meek et al. | 239/59 X |
| 3,214,065 | 10/1965 | Thornton | 239/59 X |
| 3,754,707 | 8/1973 | Morane | 239/59 |
| 3,840,145 | 10/1974 | Almanza | 220/87.1 |
| 4,258,004 | 3/1981 | Valenzona et al. | 239/59 X |
| 4,630,775 | 12/1986 | Mandon et al. | 239/59 X |
| 4,917,254 | 4/1990 | Ciriacks | 220/87.1 X |
| 5,174,462 | 12/1992 | Hames | 220/87.1 |

FOREIGN PATENT DOCUMENTS 560143  3/1975  Switzerland ............... 239/59

*Primary Examiner*—David J. Walczak
*Assistant Examiner*—Kathleen J. Prunner
*Attorney, Agent, or Firm*—Goldstein & Canino

[57] ABSTRACT

A trash can device, comprising an upper housing and a lower housing. The lower housing is sized to fit within the upper housing. A chemical disk containing both pesticide and deodorizing agents is located within the lower housing. The lower housing has lower housing circumference openings. The upper housing has upper housing circumference openings. The lower housing and upper housing are coaxially rotatable to selectively bring the upper housing circumference openings into alignment with the lower housing circumference openings to allow selective release of the pesticide and deodorizing agents or prevent premature release thereof. The upper housing may have a lid having a lid flange for use upon a trash can having an upper lip, such that the device covers the trash can with the lid flange extending over the upper lip of said trash can.

7 Claims, 2 Drawing Sheets

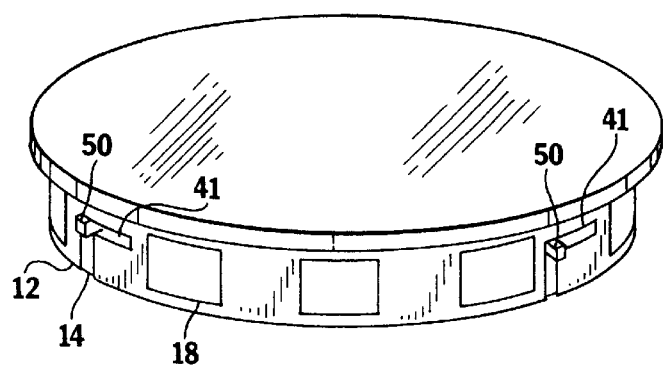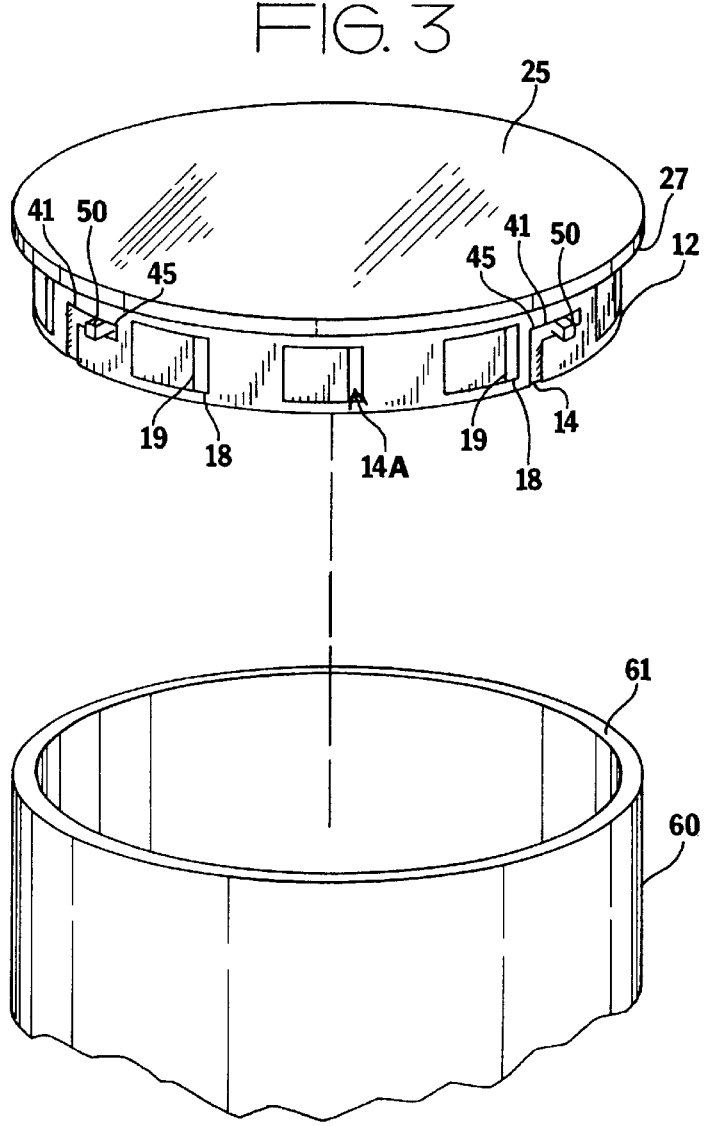

DEODORANT AND PESTICIDE RELEASING TRASH CAN DEVICE

BACKGROUND OF THE INVENTION

The invention relates to a deodorant and pesticide releasing trash can device. More particularly, the invention relates to a trash can component which selectively dispenses both deodorant and pesticide agents.

Although the smells and health hazards associated with the storage of trash is well known, it is a reality that trash must often be stored for several days before it is picked up by municipal or private trash collecting services. Thus, trash often must be stored relatively close to living areas.

The dual problems of resulting health hazards and unpleasant odors often coexist in most garbage storage areas, since rotting garbage often produces scents which are unpleasant to humans, but which attract pests which themselves carry diseases.

U.S. Pat. No. 4,047,775 to Wolbrink discloses a trash compactor which incorporates a deodorizer for continually releasing a scent to the air in the compactor cabinet to mask odors emanating from the compacted trash. Unfortunately Wolbrink simply masks the odors from the trash, but does nothing to prevent pests from infesting the garbage therein.

While these units may be suitable for the particular purpose employed, or for general use, they would not be as suitable for the purposes of the present invention as disclosed hereafter.

SUMMARY OF THE INVENTION

It is an object of the invention to produce a trash can device which reduces or eliminates odors associated with rotting garbage. Accordingly, means for releasing deodorant are provided to mask any unpleasant odors emanating from the garbage.

It is another object of the invention to provide a trash can device which repels or kills pests such as insects and rodents, to eliminate the health hazards associated with pest infestation. Accordingly, pest repellent and/or poison is dispensed.

It is a further object of the invention that the speed of deodorant and pesticide release can be controlled. Accordingly, venting to the pesticide and deodorant containing chamber is controllable by the user to dispense the agents as needed.

It is a still further object of the invention that the trash can device does not interfere with the normal use of the trash can. Accordingly, the device may be incorporated within the lid of a standard trash can, or may be used in a replacement lid, so that the pesticide and deodorant agents are released precisely where needed, and access to the containing chamber is easily obtained.

The invention is a trash can device, comprising an upper housing and a lower housing. The lower housing is sized to fit within the upper housing. A chemical disk containing both pesticide and deodorizing agents is located within the lower housing. The lower housing has lower housing circumference openings. The upper housing has upper housing circumference openings. The lower housing and upper housing are coaxially rotatable to selectively bring the upper housing circumference openings into alignment with the lower housing circumference openings to allow selective release of the pesticide and deodorizing agents or prevent premature release thereof. The upper housing may have a lid having a lid flange for use upon a trash can having an upper lip, such that the device covers the trash can with the lid flange extending over the upper lip of said trash can.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is a diagrammatic perspective view of the invention, per se.

FIG. 3 illustrates the invention is use, being used to cover a trash can.

DETAILED DESCRIPTION OF THE PREFERRED EMBODIMENTS

Figure 1:
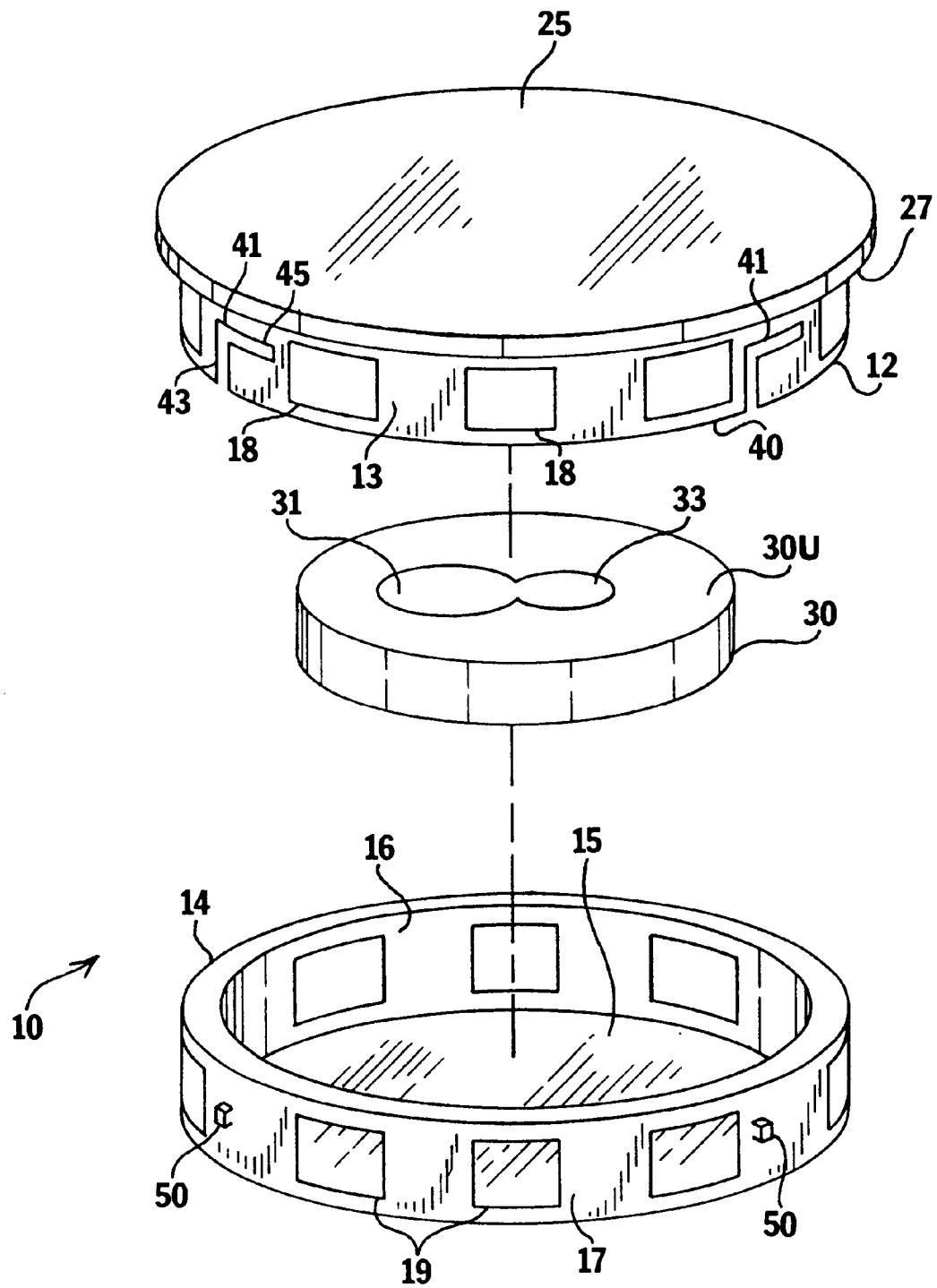
FIG. 1 is a diagrammatic perspective assembly view, illustrating the invention, per se.

FIG. 1 illustrates a trash can device 10, comprising an upper housing 12 and a lower housing 14. The upper housing 12 and lower housing 14 are substantially cylindrical in shape. The lower housing 14 is sized to fit within the upper housing 12. The lower housing has a bottom disk 15 at one end of its cylinder, and an open end 16 at the other end of its cylinder. The lower housing thereby forms a cup-like configuration which defines a lower housing interior 14A.

A chemical disk 30, having an upper surface 30U, is inserted into the lower housing 14 and rests upon the bottom disk 15. The chemical disk 30 preferably contains deodorizing agents 31 and pesticide agents 33 in separate compartments, which are released through the upper surface 30U. The pesticide agents 33 which may be used according to the present invention include actual pesticide and antibacterial agents, as well as any chemicals which repel pests or otherwise deter their growth and reproduction. Prior to use, the upper surface 30U is preferably sealed with a protective cover, to prevent premature release of the deodorizing agents 31 and pesticide agents 33. The protective cover is removed just prior to placing the chemical disk 30 within the lower housing 14.

The upper housing 12 has a upper housing circumference 13 having a plurality of upper housing circumference openings 18. The lower housing 14 has a lower housing circumference 17 having a plurality of lower housing circumference openings 19. When the lower housing 14 is located within the upper housing 12, the upper housing circumference openings 18 are selectively in communication with the lower housing circumference openings 19 to selectively provide gaseous communication between the lower housing interior and the environment around the trash can device 10. The upper housing has a lid 25 which may be sized and configured to fit and cover different standard trash cans. The lid 25 has a lid flange 27 for mating with said standard trash cans. The trash can device 10 may also be configured to fit in a trash can bottom, side, or the like.

Also illustrated in FIG. 1, the upper housing 12 has an upper housing bottom lip 40 and at least two track slots 41 which extend in the upper housing circumference 13 from the upper housing bottom lip 40. Preferably the track slot 41 is "L" shaped, having a vertical component 43 extending directly perpendicularly upward from the upper housing bottom lip 40, and a horizontal component 45 extending horizontally from the vertical component 43 and extending parallel to the lid 25 and bottom lip 40.

Further in FIG. 1, the lower housing 14 has at least two guide projections 50 located on the lower housing circumference 17, and extending radially outward therefrom. One guide projection 50 is present for each track slot 41. The guide projections 50 are spaced on the lower housing circumference to match spacing between the track slots 41 on the upper housing circumference 13. More particularly, the spacing of the guide projections 50 matches spacing between the vertical components 43 of the track slots 41.

Once the chemical disk 30 has been placed on the bottom disk 15 of the lower housing 14, the trash can device is assembled in the direction shown in FIG. 1, by aligning the guide projections 50 with the vertical components 43 of the track slots 41 and urging the lower housing 14 upward into the upper housing 12, until the guide projections 50 extend fully upward into the vertical components 43 as illustrated in FIG. 2.

In FIG. 2, the upper housing 12 and lower housing 14 have been assembled together. In FIG. 2, the upper housing 12 and lower housing 14 are in relative rotary positions such that the upper housing circumference openings 18 illustrated are not aligned with the lower housing circumference openings (not shown). Note the position of the guide projections 50 within the track slots 41.

However, in FIG. 3, the guide projections 50 have been moved within the track slot 41 by coaxially rotating the upper housing 12 with respect to the lower housing 14 and thus moving the guide projections 50 horizontally within the horizontal components 45 of the track slots 41. The lower housing circumference openings 19 are thereby partially aligned the upper housing circumference openings 18, providing gaseous communication between the environment external to the trash can device 10 and the lower housing interior 14A. Thus, relative positioning of the guide projections 50 and horizontal components 45 of the track slots 41 controls the alignment of the openings 18 and 19 and thus controls the degree of pesticide and deodorant release. The precise design of the guide projections 50 and track slots 41 may be varied provided that the goals thereof are maintained—that is to allow adjustment of the upper housing circumference opening 18 and lower housing circumference openings 19 for varying the release of the pesticide and deodorizing agents.

Finally, in FIG. 3 the trash can device 10 is shown being installed onto a trash can 60 having an upper lip 61. The trash can device 10 has been adjusted to allow the controlled release of the pesticide and deodorizing agents, as previously described. Then, the trash can device 10 is being used to cover the trash can 60 wherein the lid flange 27 extends over the upper lip 61, and the lid 25 thereby becomes a lid for the trash can 60.

In conclusion, herein is presented a trash can device for selectively releasing deodorizing and pesticide agents, comprising an upper housing and a lower housing sized to fit within the upper housing and rotating therein. A chemical disk containing the deodorizing and pesticide agents is placed within the lower housing prior to assembly of the upper housing and lower housing. The upper housing and lower housing each have openings which are selectively partially or fully aligned to control release of the deodorizing and pesticide agents therethrough, and preventing the premature release thereof.

What is claimed is:

1. A trash can device, comprising:

an upper housing having an upper housing circumference and at lease two track slots;

a lower housing sized to fit within the upper housing, having a lower housing circumference and at least two guide projections, the track slots of the upper housing spaced to match said guide projections, wherein the guide projections extend into the track slots and allow selective movement therein to allow adjustment of the lower housing with respect to the upper housing;

a chemical disk, contained within the lower housing, having pesticide agents and deodorizing agents; and a means for controlling release of the pesticide agents and deodorizing agents comprising upper housing circumference openings which are coaxially rotatable to selectively align, partially align, and misaligned lower housing circumference openings to respectively release, slowly release and stop release of said pesticide and deodorizing agents.

2. The trash can device as recited in claim 1, wherein the upper housing has an upper housing bottom lip, the track slot is L-shaped, having a vertical component extending perpendicularly upward from the upper housing bottom lip and a horizontal component extending parallel to said bottom lip.

3. The trash can device as recited in claim 2, wherein the upper housing has a lid, the lid having a flange for effectively covering a trash can.

4. A trash can deodorizing and pest control method, using a device having an upper housing and a lower housing, the lower housing sized to fit within the upper housing, the lower housing containing a chemical disk having pesticide and deodorizing agents, the upper housing having upper housing circumference openings and at least two "L" shaped track slots having a horizontal component and a vertical component, the lower housing having lower housing circumference openings and at least two guide projections, comprising the steps of:

placing the chemical disk within the lower housing;

assembling the lower housing and upper housing together by aligning each guide projection with one of the vertical components and sliding the guide projections into the vertical components by moving the lower housing upward, and then coaxially rotating the lower housing and upper housing to lock the upper housing and lower housing together; and controlling release of the pesticide and deodorizing agents by selectively aligning the lower housing circumference openings and upper housing circumference openings by coaxially rotating the upper housing with respect to the lower housing.

5. The trash can deodorizing and pest control method as recited in claim 4, wherein the step of controlling release of the pesticide and deodorizing agents by selectively aligning the lower housing circumference openings and upper housing circumference openings further comprises moving the guide projections within the horizontal slots.

6. The trash can deodorizing and pest control method as recited in claim 5, wherein the chemical disk is initially covered by a protective covering to prevent premature release of the pesticide and deodorizing agents, and wherein the steps of placing the chemical disk within the lower housing is preceded by removing the protective covering from the chemical disk.

7. The trash can deodorizing and pest control method as recited in claim 6, wherein the device is used with a trash can having an upper lip, and wherein said device has a lid flange extending outward from the upper housing, and wherein the method as recited further comprises the step of covering the trash can with the device, the lid flange extending over the upper lip of the trash can.

* * * * *